United States Patent
Vance et al.

(10) Patent No.: US 11,112,282 B2
(45) Date of Patent: Sep. 7, 2021

(54) CONCEALED FIRE DETECTOR SUSPENSION APPARATUS

(71) Applicants: Julian Vance, Strathdale (AU); Steven Cliffe, Strathdale (AU)

(72) Inventors: Julian Vance, Strathdale (AU); Steven Cliffe, Strathdale (AU)

( * ) Notice: Subject to any disclaimer, the term of this patent is extended or adjusted under 35 U.S.C. 154(b) by 0 days.

(21) Appl. No.: 17/048,070

(22) PCT Filed: May 16, 2019

(86) PCT No.: PCT/AU2019/050465
§ 371 (c)(1),
(2) Date: Oct. 15, 2020

(87) PCT Pub. No.: WO2019/218018
PCT Pub. Date: Nov. 21, 2019

(65) Prior Publication Data
US 2021/0096005 A1    Apr. 1, 2021

(30) Foreign Application Priority Data

May 18, 2018    (AU) ................. 2018901739

(51) Int. Cl.
*G01D 11/24*    (2006.01)
*A62C 37/36*    (2006.01)

(52) U.S. Cl.
CPC ............ *G01D 11/245* (2013.01); *A62C 37/04* (2013.01)

(58) Field of Classification Search
CPC ............................ G01D 11/245; A62C 37/04
See application file for complete search history.

(56) References Cited

U.S. PATENT DOCUMENTS

| | | | |
|---|---|---|---|
| 4,656,689 | A | 4/1987 | Dennis |
| 4,887,073 | A | 12/1989 | Nakao et al. |
| 4,926,946 | A | 5/1990 | Polan |
| 5,149,038 | A | 9/1992 | VanCleve |

(Continued)

FOREIGN PATENT DOCUMENTS

| | | |
|---|---|---|
| GB | 2522185 A | 7/2015 |
| JP | 2015118421 A | 6/2015 |

OTHER PUBLICATIONS

Australian Search Report dated Aug. 17, 2018 from Australian Application No. 2018901739.

(Continued)

*Primary Examiner* — Jamel E Williams
(74) *Attorney, Agent, or Firm* — Innovation Capital Law Group; Vic Lin

(57) ABSTRACT

Concealed fire detector suspension apparatus has a fixing collar and a plurality of radial locking tabs insertable therethrough. A removeable fixing foot is configured for engaging a stem of an upright support for a fire detector and having a peripheral outward locking formations which mechanically interlock with corresponding inward locking formations on an inner surface of the fixing collar. In use, the apparatus is configured for installing the fixing collar via a ceiling cutout, inserting the radial locking tabs through the fixing collar from the interior thereof to clamp the ceiling, inserting the upright support through the fixing collar and locking the outward locking formations of the fixing foot to the corresponding inward locking formations of the cylindrical body, thereby supporting the upright support through the ceiling.

19 Claims, 5 Drawing Sheets

(56) References Cited

U.S. PATENT DOCUMENTS

| | | |
|---|---|---|
| 5,281,954 A | 1/1994 | Harrison et al. |
| 2008/0078841 A1 | 4/2008 | Messmer et al. |
| 2009/0091941 A1 | 4/2009 | Svensson |

OTHER PUBLICATIONS

International Search Report & Written Opinion dated Jul. 12, 2019 from PCT Application No. PCT/AU2019/050465.

CONCEALED FIRE DETECTOR SUSPENSION APPARATUS

FIELD OF THE INVENTION

This invention relates generally to fire detector holders. More particularly, this invention relates to fire detector holders for suspension of concealed fire detectors within ceiling plenums.

BACKGROUND OF THE INVENTION

Concealed fire detectors are installed in ceiling plenums. The present invention seeks to provide apparatus to improve the installation and access of such concealed fire detectors.

SUMMARY OF THE DISCLOSURE

The present concealed fire detector suspension apparatus has a fixing collar and a removable fixing foot attachable to the fixing collar.

The fixing collar is fixed within an aperture in a ceiling. An upright support (typically comprising a vertical stem and radial arm supporting a fire detector at a distal end thereof) is affixed to a fixing foot which is then inserted through the fixing collar to be supported within the plenum by the fixing collar.

The fixing collar has a fixing annulus. A plurality of radial locking tabs are insertable through the fixing collar from an interior thereof to clamp in opposition to the fixing annulus.

The fixing collar may comprise a male piece and a female piece. Furthermore, each radial locking tab may comprise upright and radial portions. As such, the female piece may be inserted first and the radial locking tabs inserted through slots thereof. Arrowhead bosses may hold the radial locking tabs to the female piece.

The male piece may then be screwed into the female piece such that the upright portions of each locking tab are entrapped therebetween. The male and female pieces may comprise recesses to accommodate the upright portions between screw threading thereof.

As the male piece is screwed to the female piece, the radial locking tabs and the fixing annulus clamp together to hold the fixing collar within the ceiling aperture.

The fixing foot comprises outer locking formations which interlock with corresponding inner locking formations of the fixing collar.

The locking formations may allow for the convenient twist-in locking of the fixing foot to the fixing collar and which may be secured by releasable locking pins.

The fixing foot may be concealed within the fixing collar by a removable cover plate.

According to one aspect there is provided concealed fire detector suspension apparatus comprising: a fixing collar having a fixing annulus and a plurality of radial locking tabs insertable through the fixing collar from an interior of the fixing collar to extend radially therefrom to clamp in opposition to the fixing annulus in use; and a removeable fixing foot configured for engaging a stem of an upright support for a fire detector and having a peripheral outward locking formations which mechanically interlock with corresponding inward locking formations on an inner surface of the fixing collar such that in use, the apparatus is configured for installing the fixing collar via a ceiling cutout, inserting the radial locking tabs through the fixing collar from the interior thereof to clamp the ceiling in opposition to the fixing annulus, inserting the upright support through the fixing collar and locking the outward locking formations of the fixing foot to the corresponding inward locking formations of the fixing collar, thereby supporting the upright support through the ceiling.

Each outward locking formation may comprise a protrusion profile and each inward locking may comprise a buttress and wherein the protrusion profile bears downwardly on the buttress.

The protrusion profile may comprise an over protrusion portion and adjacent side protrusion portions which cooperate to receive an upper edge of a respective buttress therebetween.

The side protrusion portions may comprise a long side protrusion portion and a short side protrusion portion such that the locking formation can be rotated over the buttress at the short side protrusion portion.

The fixing collar may comprise an upper rim having a diameter less than a maximum diameter of the fixing foot.

The apparatus may further comprise locking pins configured to extend radially outward from each outward locking formation to engage respective inward locking formations.

Each inward locking formation may comprise a buttress may comprise an underside vertical notch to receive a distal end of the locking pin therein.

When engaged at an apex of the notch, the locking pin may prevents a protrusion profile of a respective outward locking formation from being lifted from the buttress.

The fixing foot may have an undersurface profile that exposes proximal ends of each locking pin such that each proximal end of each locking pin can be access therethrough for pushing each locking pin radially outward.

Each locking pin may comprise an extension knob at a proximal end thereof.

The fixing collar may comprise a male piece and a female piece which engage together to lock portions of the radial locking tabs therebetween.

Each radial locking tab may comprise an upright portion and a radial portion and wherein the male piece may comprise the fixing annulus and wherein the male piece may comprise a male cylindrical body comprising outer threading and wherein the female piece may comprise a female cylindrical body comprising inner threading for the outer threading and wherein the female piece may comprise slots for accommodating each radial portion therethrough.

At least one of the male piece and female piece may comprise recesses to accommodate the upright portions between the male piece in the female piece.

The upright portion may be semicylindrical.

The radial portion may comprise a U-shaped cross-section.

Each radial locking tab may comprise a radial locking arrowhead bosses which interlock with corresponding apertures through the fixing collar.

When the fixing foot is mechanically locked to the fixing collar, the fixing foot may be recessed within an interior of the cylindrical body and further comprising a cover plate attachable to the fixing annulus to conceal the fixing foot therein.

The stem may be telescopic.

The fixing foot may comprise radial feet each having an outward locking formation at a distal end thereof.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
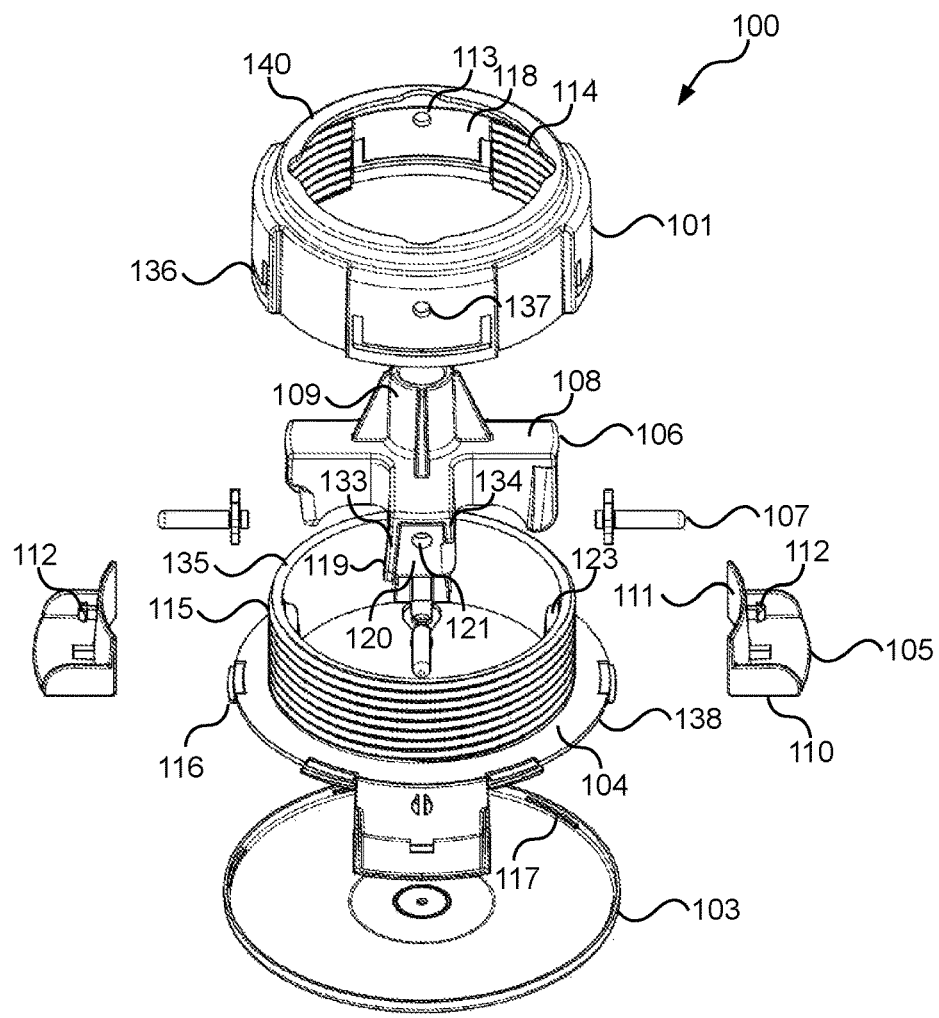
FIG. 1 shows a top perspective disassembled view of concealed fire detector suspension apparatus in accordance with an embodiment.
Figure 2:
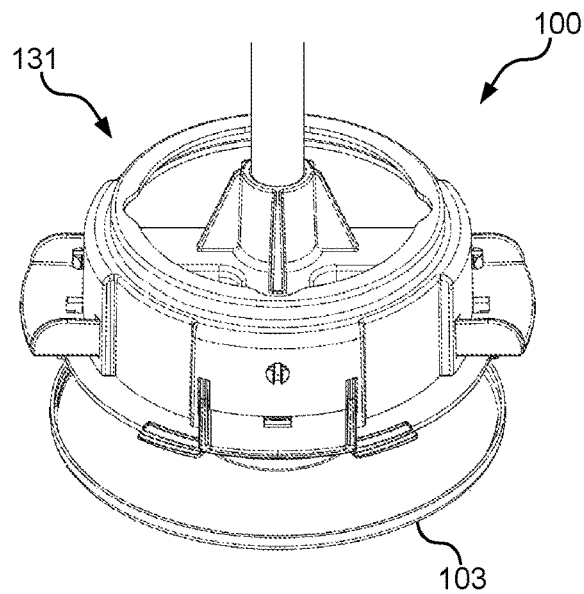
FIG. 2 shows an assembled view of the apparatus.

FIGS. 1 and 2 show fire detector suspension apparatus 100 respectively disassembled and assembled.

The apparatus 100 comprises a fixing collar 131 having a cylindrical body and a fixing annulus 104. The apparatus 100 further comprises a plurality of radial locking tabs 105 insertable through the cylindrical body 131 from an interior of the cylindrical body 131 to extend radially therefrom to clamp in opposition to the fixing annulus 104 in use.

The apparatus 100 further comprises a removable fixing foot 106 configured for engaging a stem 124 of an upright support 132.

The fixing foot 106 comprises outward locking formations which mechanically interlock with corresponding inward locking formations of an inner surface of the cylindrical body.

Figure 3:
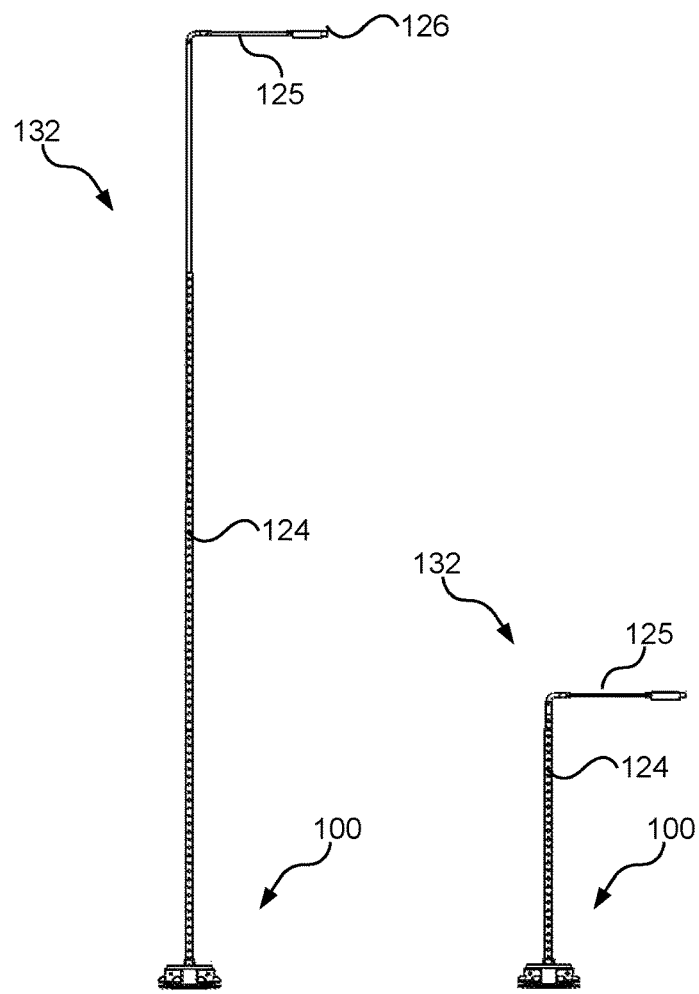
FIG. 3 illustrates the apparatus supporting upright support of various configurations.

As such, as is illustrated in FIG. 3, in use, the apparatus 100 is configured for installing the fixing collar 131 via a circular ceiling cutout. Then, the radial locking tabs 105 can be inserted through the cylindrical body from an interior thereof to clamp the ceiling against the fixing annulus 104.

The upright support 132 is then inserted through the fixing collar 131. The outward locking formations of the fixing foot 106 lock to the corresponding inward locking formations of the cylindrical body, thereby supporting the upright support 132 through the ceiling.

The upright support 132 may comprise the vertical upright 124 and radial arm 125 joined at an elbow 130. The upright stem 132 may be telescopic so as to allow for differing height configurations illustrated in FIG. 3. The upright stem 132 may comprise a plurality of coaxial telescopic portions and, in embodiments, detent and locking pin apertures for fixing.

Figure 4:
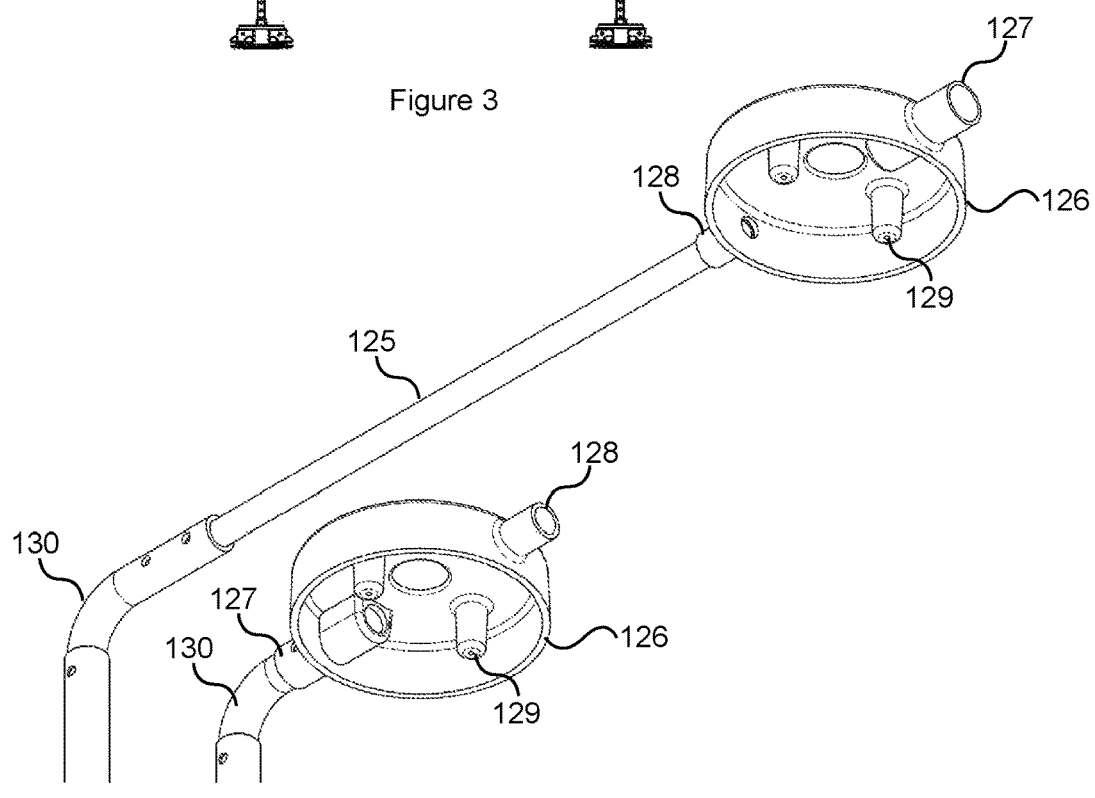
FIG. 4 illustrates upright support of various configurations.

With reference to FIG. 4, the apparatus 100 may comprise a fire detector holder housing 126. The housing 126 may comprise screw hole aperture buttresses 129 to which the fire detector (not shown) may be attached.

The housing 126 may comprise a major attachment collar 127 which may attach directly to the elbow 130. The housing 126 may comprise a minor attachment collar 128 which may engage an extension arm 125.

The elbow 130, extension arm 125 and collars 127, 128 may comprise a releasable detent and aperture arrangement.

The fixing foot 106 may comprise a quadrant of radial toes 108, the distal ends of which may define an outward locking formation 120.

The foot 106 may comprise a coaxial collar 109 strengthened by radially angled flanges into which a proximal end of the upright 124 may be inserted and secured, similarly by detent and aperture arrangement in embodiments.

The outward locking formation 120 may comprise a protrusion profile 119. Furthermore, with reference to FIG. 5, the inward locking formations may comprise buttresses 123. As such, each protrusion profile 119 may catch over an upper edge of each respective buttress 123 to bear downwardly thereon.

In embodiments, the protrusion profile 119 may comprise an over protrusion portion and adjacent side protrusion portions 133, 134 which cooperate to receive the upper edge of the respective buttress 123 therebetween. Furthermore, the side protrusion portions may comprise a long side protrusion portion 133 and a short side protrusion portion 134 such that the outward locking formation can be rotated over the buttress at the short side protrusion portion 134.

The apparatus 100 may further comprise a plurality of locking pins 107 which extend radially outwardly from each outward locking formation to engage each respective buttress 123. In this regard, each outward locking formation may comprise a central aperture 121 through which a respective locking pin 107 extends. Each buttress 123 may comprise a vertical underside notch 142 which receives the distal end of each locking pin 107.

When engaged at the apex of the notch 124, the locking pin 107 prevents the protrusion profile 119 from being lifted from the buttress 123.

With reference to FIGS. 5-9, the fixing foot 106 comprises an open underside profile exposing proximal ends of each locking pin 107. As such, each locking pin 107 may be accessed to be pushed outwardly to engage the buttresses 123.

The fixing collar 131 may comprise a male piece 138 and a female piece 101. The male piece 138 may comprise the fixing annulus 104 and an inner male piece collar 135 comprising outer threading 115. The female piece 101 may comprise inner threading 114 for the outer threading 115.

Furthermore, each radial locking tab 105 may comprise an upright portion 111 (preferably being semicylindrical) and a radial portion 110 (preferably comprising a U-shaped channel cross-section for bending resilience).

The female piece 101 may comprise profile slots 136 which receive the radial portions 110 therethrough.

Furthermore, at least one of the male piece 138 and the female piece 101 may comprise recesses 118 to accommodate the upright portions between the threading 114, 115.

Figure 10:
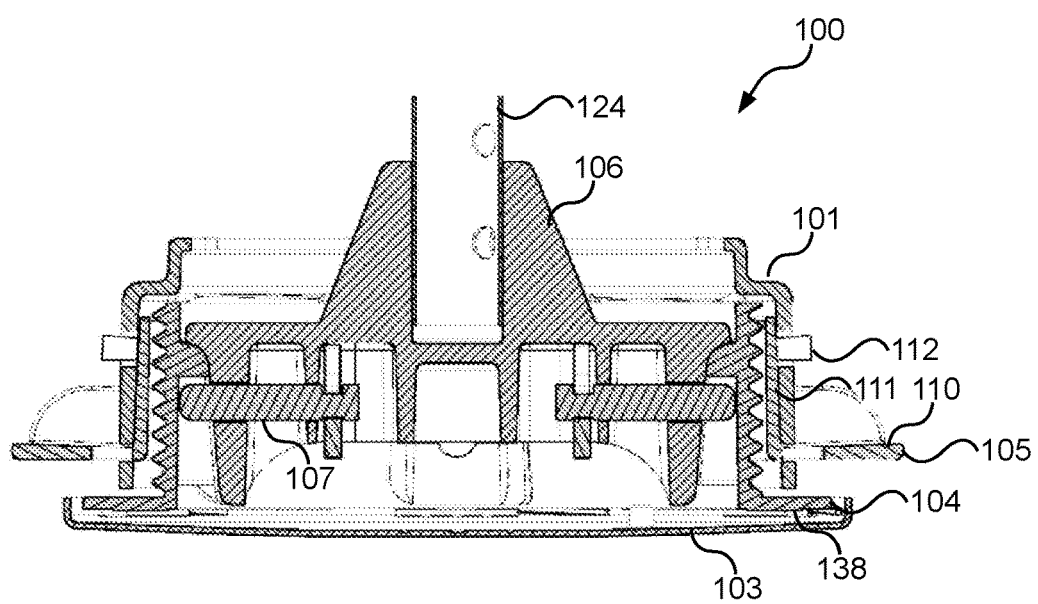
FIG. 10 illustrates a cross-sectional elevation view of the apparatus.

As such, as is illustrated in FIG. 10, the female piece 101 and the male piece 138 entrap the vertical portions 111 of each radial locking tab 105 therebetween with the radial portions 110 extending via the slots such that the radial portions 110 clamp in opposition to the radial flange 104.

Each radial locking tab 105 may comprise a radial arrowhead boss 112 which interlocks within a corresponding aperture 137 to hold the radial locking tabs 105 in place to the female piece 101 while the male piece 138 is inserted.

The fixing foot 106 may be wholly incorporated within the cylindrical body of the fixing collar so as to be concealable with a cover plate 103 attachable to the fixing annulus by way of corresponding radial locking tabs 116, 117.

Exemplary installation of the apparatus 100 is now provided with reference to FIGS. 5-9.

A circular cutout is made in a ceiling. The cutout is made to have a diameter less than that of the radial flange 104 but greater than that of the female piece 101.

The female piece 101 is then inserted through the cutout and the radial locking tabs 105 inserted through the slot 136 from an interior of the female piece 101. As alluded to above, the radial arrowhead bosses 112 may hold the locking tabs 105 in place.

The male piece 138 is then screwed into the female piece 101, thereby entrapping the vertical portions 111 of each locking tab 105 between the female piece 101 and the male piece 138.

Figure 5:
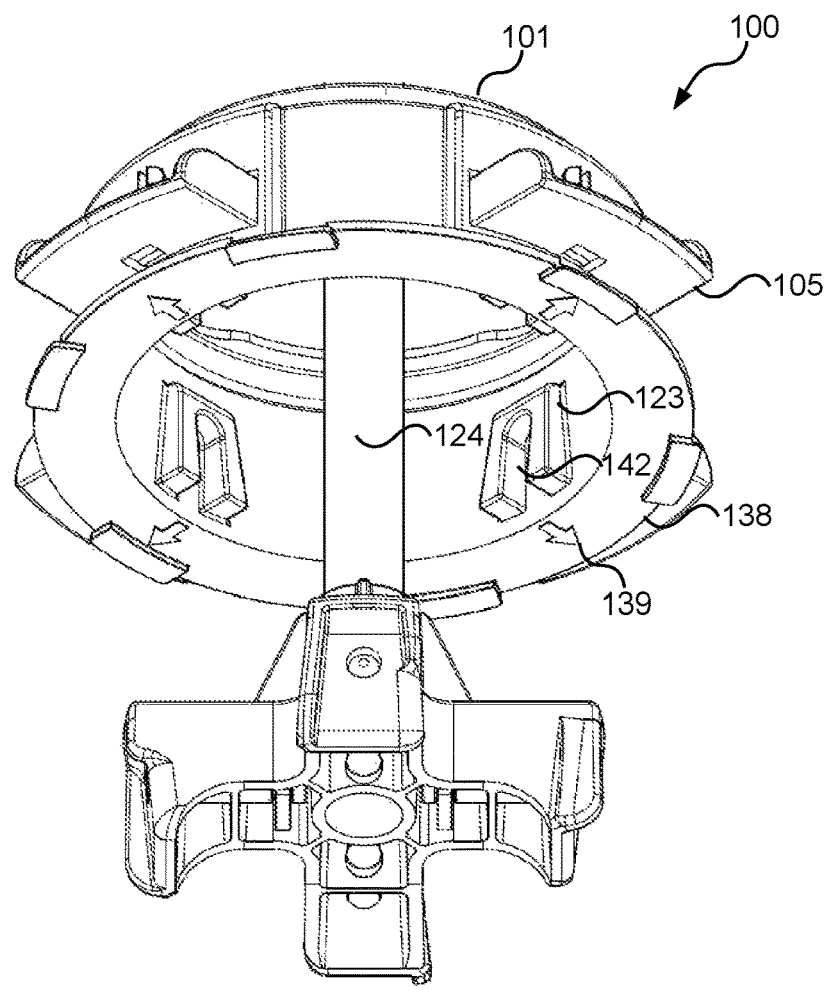
FIGS. 5-9 illustrate the steps of the installation of the apparatus.

FIG. 5 illustrates the insertion of the upright support 132 via the installed collar 131.

An undersurface of the flange 104 may comprise a rotational offset indicator arrows 139 indicating the locations of the buttresses 123. As such, the fixing foot 106 is inserted such that the radial toes 108 may thereof locate in line with the indicator arrows 138.

Figure 6:
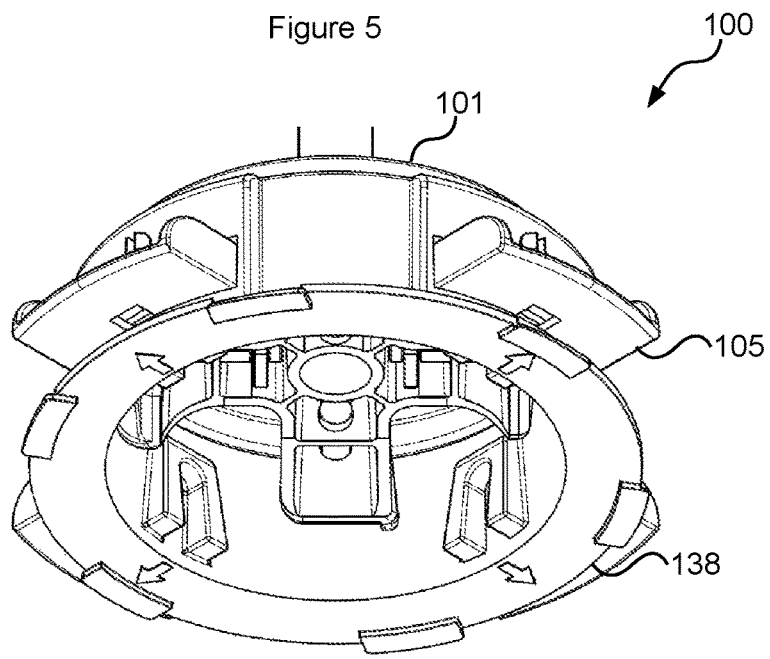

FIG. 6 illustrates the radial foot 106 having been inserted into the installed fixing collar 131.

An upper rim 140 of the female piece 101 comprises less diameter than that of the maximum diameter of the fixing foot 106, thereby preventing the fixing foot 106 from passing therethrough.

Figure 7:
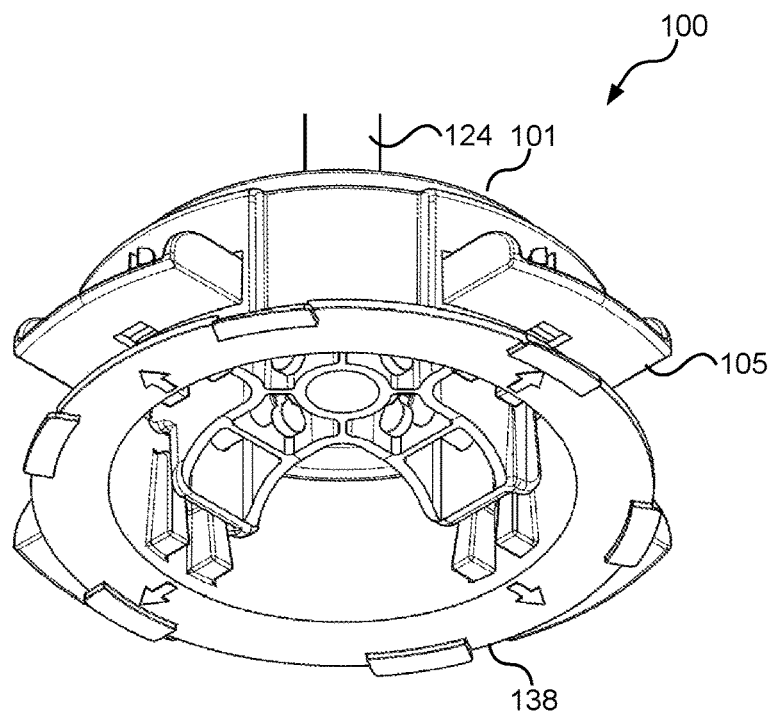
Figure 8:
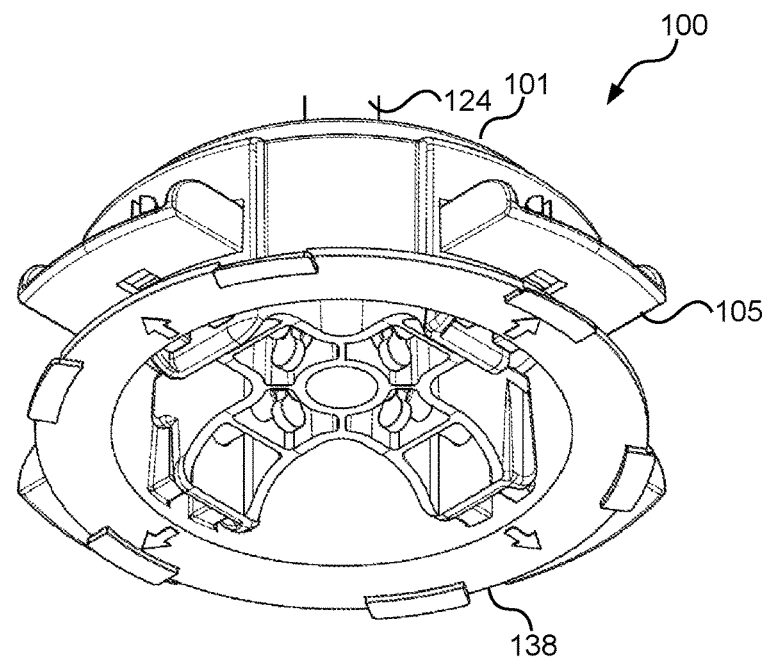

FIGS. 7 and 8 illustrate the clockwise rotation of the fixing foot 106 with respect to the installed fixing collar 131 until such time that the long side protrusions 133 abut against respective sides of the buttresses 123, thereby preventing further rotation.

The foot 106 then drops down (such as by gripping the foot 106 between the radial feet 108) such that the protrusion profile 119 engages upper edges of the respective buttresses 123. As can be seen, the outward locking formation 120 may have an angled face so as to jam downwardly against the corresponding upwardly angled face of the notch 124.

Figure 9:
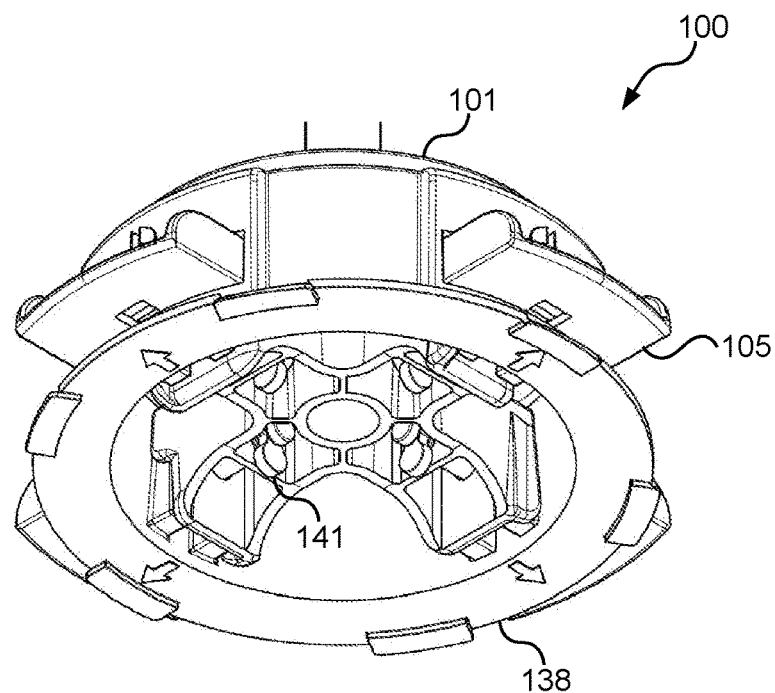

FIG. 9 illustrates the pushing of the locking pins 107 outwardly to engage the notches 142 of each buttress 123.

An extension knob 141 may attach to proximal ends of each locking pin to ease access thereto.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. Concealed fire detector suspension apparatus comprising: a fixing collar having a fixing annulus and a plurality of radial locking tabs insertable through the fixing collar from an interior of the fixing collar to extend radially therefrom to clamp in opposition to the fixing annulus in use; and a removeable fixing foot configured for engaging a stem of an upright support for a fire detector and having a peripheral outward locking formations which mechanically interlock with corresponding inward locking formations on an inner surface of the fixing collar such that in use, the apparatus is configured for installing the fixing collar via a ceiling cutout, inserting the radial locking tabs through the fixing collar from the interior thereof to clamp the ceiling in opposition to the fixing annulus, inserting the upright support through the fixing collar and locking the outward locking formations of the fixing foot to the corresponding inward locking formations of the fixing collar, thereby supporting the upright support through the ceiling.

2. Apparatus as claimed in claim 1, wherein each outward locking formation comprises a protrusion profile and wherein each inward locking comprises a buttress and wherein the protrusion profile bears downwardly on the buttress.

3. Apparatus as claimed in claim 2, wherein the protrusion profile comprises an over protrusion portion and adjacent side protrusion portions which cooperate to receive an upper edge of a respective buttress therebetween.

4. Apparatus as claimed in claim 3, wherein the side protrusion portions comprise a long side protrusion portion and a short side protrusion portion such that the locking formation can be rotated over the buttress at the short side protrusion portion.

5. Apparatus as claimed in claim 1, wherein the fixing collar comprises an upper rim having a diameter less than a maximum diameter of the fixing foot.

6. Apparatus as claimed in claim 1, further comprising locking pins configured to extend radially outward from each outward locking formation to engage respective inward locking formations.

7. Apparatus as claimed in claim 6, wherein each inward locking formation comprises a buttress comprises an underside vertical notch to receive a distal end of the locking pin therein.

8. Apparatus as claimed in claim 7, wherein, when engaged at an apex of the notch, the locking pin prevents a protrusion profile of a respective outward locking formation from being lifted from the buttress.

9. Apparatus as claimed in claim 6, wherein the fixing foot has an undersurface profile that exposes proximal ends of each locking pin such that each proximal end of each locking pin can be access therethrough for pushing each locking pin radially outward.

10. Apparatus as claimed in claim 9, wherein each locking pin comprises an extension knob at a proximal end thereof.

11. Apparatus as claimed in claim 1, wherein the fixing collar comprises a male piece and a female piece which engage together to lock portions of the radial locking tabs therebetween.

12. Apparatus as claimed in claim 11, wherein each radial locking tab comprises an upright portion and a radial portion and wherein the male piece comprises the fixing annulus and wherein the male piece comprises a male cylindrical body comprising outer threading and wherein the female piece comprises a female cylindrical body comprising inner threading for the outer threading and wherein the female piece comprises slots for accommodating each radial portion therethrough.

13. Apparatus as claimed in claim 12, wherein at least one of the male piece and female piece comprises recesses to accommodate the upright portions between the male piece in the female piece.

14. Apparatus as claimed in claim 12, wherein the upright portion is semicylindrical.

15. Apparatus as claimed in claim 12, wherein the radial portion comprises a U-shaped cross-section.

16. Apparatus as claimed in claim 1, wherein each radial locking tab comprises a radial locking arrowhead bosses which interlock with corresponding apertures through the fixing collar.

17. Apparatus as claimed in claim 1, wherein, when the fixing foot is mechanically locked to the fixing collar, the fixing foot is recessed within an interior of the fixing collar and further comprising a cover plate attachable to the fixing annulus to conceal the fixing foot therein.

18. Apparatus as claimed in claim 1, wherein, the stem is telescopic.

19. Apparatus as claimed in claim 1, wherein, the fixing foot comprises radial feet each having an outward locking formation at a distal end thereof.

\* \* \* \* \*